United States Patent
Bullin

(10) Patent No.: US 11,629,759 B2
(45) Date of Patent: Apr. 18, 2023

(54) DRIVE SHAFT ASSEMBLY FOR DOWNHOLE DRILLING MOTORS

(71) Applicant: DASH DRILLING PRODUCTS, LLC, Bryan, TX (US)

(72) Inventor: Keith Bullin, Bryan, TX (US)

(73) Assignee: DASH DRILLING PRODUCTS, LLC, Bryan, TX (US)

( * ) Notice: Subject to any disclaimer, the term of this patent is extended or adjusted under 35 U.S.C. 154(b) by 351 days.

(21) Appl. No.: 16/864,106

(22) Filed: Apr. 30, 2020

(65) Prior Publication Data

US 2021/0340817 A1    Nov. 4, 2021

(51) Int. Cl.
F16D 3/221 (2006.01)
E21B 17/04 (2006.01)
F16D 3/18 (2006.01)
F16D 3/48 (2006.01)

(52) U.S. Cl.
CPC .............. *F16D 3/221* (2013.01); *E21B 17/04* (2013.01); *F16D 3/18* (2013.01); *F16D 3/48* (2013.01)

(58) Field of Classification Search
CPC ... F16D 3/221; F16D 3/18; F16D 3/48; E21B 17/04
USPC .......................................... 464/140, 141, 155
See application file for complete search history.

(56) References Cited

U.S. PATENT DOCUMENTS

| | | | |
|---|---|---|---|
| 1,782,492 A * | 11/1930 | Van | F16D 3/48 |
| 5,000,723 A | 3/1991 | Livingstone | |
| 5,267,905 A | 12/1993 | Wenzel et al. | |
| 5,651,737 A | 7/1997 | Le Blanc | |
| 5,704,838 A | 1/1998 | Teale | |
| 6,569,020 B1 | 5/2003 | Falgout, Sr. | |
| 6,949,025 B1 * | 9/2005 | Kraus | E21B 7/068 |
| 6,997,811 B1 | 2/2006 | Falgout, Sr. et al. | |
| 7,004,843 B1 | 2/2006 | Kerstetter | |
| 8,033,917 B2 | 10/2011 | Prill et al. | |
| 8,062,140 B2 | 11/2011 | Wall et al. | |
| 8,103,192 B2 * | 1/2012 | Takigawa | G03G 15/757 |
| 8,157,025 B2 | 4/2012 | Johnson | |
| 8,967,299 B2 | 3/2015 | Bullin | |
| 9,587,436 B2 | 3/2017 | Perry | |
| 10,119,333 B2 | 11/2018 | Bullin | |

* cited by examiner

Primary Examiner — Greg Binda
(74) Attorney, Agent, or Firm — Halit N. Yakupoglu

(57) ABSTRACT

A drive shaft assembly for a downhole drilling motor includes a drive shaft having a first end portion engaging a first housing and a second end portion engaging a second housing. The first end portion and the first housing form the first constant velocity joint and the second end portion and the second housing form the second constant velocity joint of the drive shaft assembly. Each end portion including a base surface having a pair of prongs extending away from the base surface and a cylindrical side wall having a plurality of ball bearings held in a plurality of circumferentially spaced pockets. Each housing includes a cavity to retain respective end portions of the drive shaft. An inner side wall of each housing includes a plurality of cylindrical grooves to receive the plurality of ball bearings to transfer torque. An internal wall of the housing includes a first chamber and a second chamber to receive and retain the first prong and the second prong to transfer torque and thrust loads between the shaft and the housings.

13 Claims, 14 Drawing Sheets

DRIVE SHAFT ASSEMBLY FOR DOWNHOLE DRILLING MOTORS

BACKGROUND

Field of the Invention

The present invention relates to joint assemblies for transmitting torque and, more particularly, to constant velocity joint assemblies for use in downhole drilling applications.

Description of the Related Art

Constant velocity joints for drive shafts can be associated with downhole motors used in the drilling industry for drilling boreholes for recovering reserves located in the geological formations, such as oil, gas, geothermal or the like. Drilling such boreholes requires transfer of large torque and axial thrust loads across the joints to rotate and advance a drill bit in the geological formations.

The rotary output shaft of conventional downhole motors used in the drilling industry moves in an eccentric manner, which must be converted into a concentric motion to rotate the drill bit of the drilling motor. This is commonly done using a drive shaft, having joints at each end, connecting the downhole motor to a drill bit assembly, thereby connecting the output member of the downhole motor to the input member of the drill bit assembly.

With the advancements in the field of directional drilling, torque transmitting and sustaining capabilities of the joints have become critical properties along with the reduction of vibrations to improve performance of the joints. Demand for improved performance has resulted in development of increased number of joint designs with various joint configurations to transmit torque.

Although some new designs improve the performance of the joints, their high design and manufacturing costs have prevented their wide spread use. However, there is still a demand for inexpensive and easily produced joints.

From the foregoing, there is a need for constant velocity joints having improved performance characteristics with low manufacturing cost.

SUMMARY

In one aspect of the present invention, a drive shaft assembly for a downhole drilling motor is provided. The drive shaft assembly includes a shaft extending along a first longitudinal axis of rotation and having a first end portion and a second end portion. Each end portion includes a circular base surface with a center on the first longitudinal axis of rotation and having a first and second prongs extending away from the base surface in the direction of the first longitudinal axis of rotation. Each of the first and second prongs has cylindrical sector shaped body, and a cylindrical side wall having a plurality of ball bearings held in a plurality of circumferentially spaced pockets. Furthermore, the drive shaft assembly includes a first housing extending along a second longitudinal axis of rotation. The first housing includes a first end including a first cavity for operatively receiving the first end portion of the shaft. The first cavity is separated from a second cavity located at a second end of the first housing by an internal wall having an internal wall surface. The first cavity includes an inner side wall having a plurality of cylindrical grooves, each of which mating with one of the plurality of ball bearings on the first end portion of the shaft to transfer torque between the shaft and the first housing with or without any angular offset between the first and second longitudinal axes of rotation. A first chamber and a second chamber formed in the internal wall surface are configured to receive and retain the first prong and the second prong to transfer torque and thrust loads between the first end portion of the shaft and the first housing while the circular base surface is supported on the internal wall surface. Furthermore, the drive shaft assembly includes a second housing extending along a third longitudinal axis of rotation. The second housing includes a first end and a second end, the first end of the second housing having a first cavity for operatively receiving the second end portion of the shaft. The circular base surface of the first end portion is a spherical surface having the center on the first longitudinal axis of rotation.

In another aspect of the present invention, a constant velocity joint is provided. The constant velocity joint includes a shaft extending along a first longitudinal axis of rotation and having an end portion. The end portion includes a circular base surface, with a center on the first longitudinal axis of rotation, having a first and second prongs extending away from the base surface and in the direction of the first longitudinal axis of rotation. Each of the first and second prongs has cylindrical sector shaped body and a cylindrical side wall having a plurality of ball bearings held in a plurality of circumferentially spaced pockets. Furthermore, the constant velocity joint includes a housing extending along a second longitudinal axis of rotation. The housing includes a first end including a first cavity for operatively receiving the end portion of the shaft. The first cavity is separated from a second cavity located at a second end of the housing by an internal wall having an internal wall surface. The first cavity includes an inner side wall including a plurality of cylindrical grooves, each of which mating with one of the plurality of ball bearings on the end portion of the shaft to transfer torque between the shaft and the first housing with or without any angular offset between the first and second longitudinal axes of rotation. A first chamber and a second chamber formed in the internal wall surface are configured to receive and retain the first prong and the second prong to transfer torque and thrust loads between the end portion of the shaft and the housing while the circular base surface is supported on the internal wall surface. The circular base surface of the end portion is a spherical surface having the center on the first longitudinal axis of rotation.

It should be understood that the above referenced drawings are schematic, not necessarily drawn to scale, as their dimensions may be varied considerably without departing from the scope of the present disclosure.

DETAILED DESCRIPTION

Before explaining the present invention in detail, it is to be understood that the system is not limited to the particular embodiments and that it may be practiced or carried out in various ways. The present invention may provide an improved motor driveline, transmission and drive shaft.

Figure 1A:
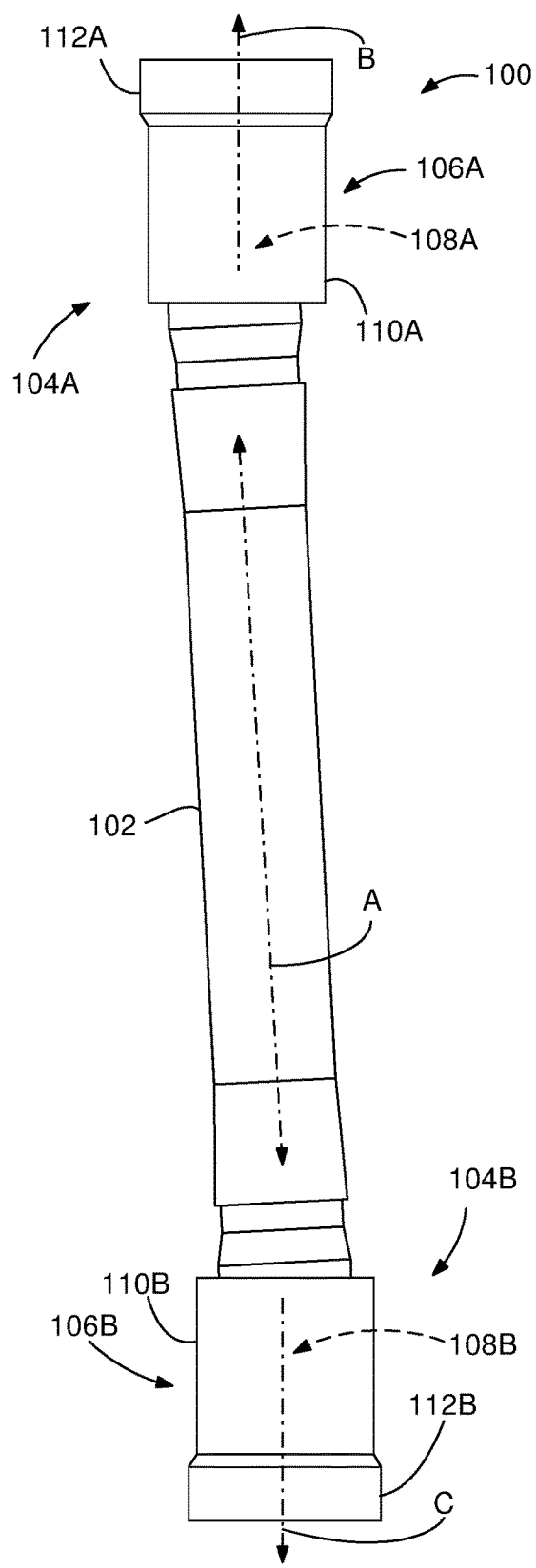
FIG. 1A is a schematic illustration of an embodiment of a drive shaft assembly of the present invention including a first and second CV joints.

Turning now to the figures, FIG. 1A shows an exemplary embodiment of a drive shaft assembly 100 of the present invention, providing a constant velocity (CV) joint system for transmitting axial and rotational forces. The drive shaft assembly 100 may include a drive shaft 102 connecting two CV joints 104, such as a first CV joint 104A and a second CV joint 104B, which will be referred to as the joint 104A and the joint 104B hereinafter.

Figure 1B:
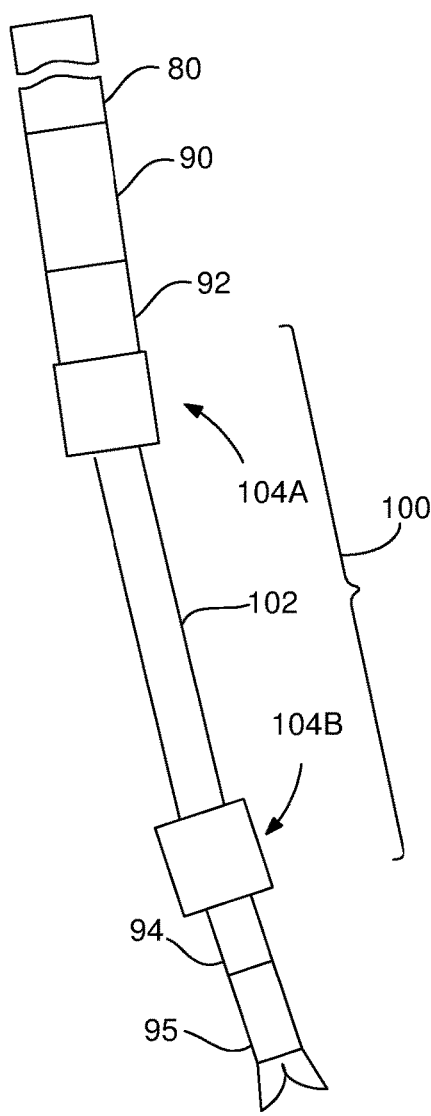
FIG. 1B is a schematic illustration of an embodiment of a drive shaft assembly assembled with an exemplary downhole motor.

In one embodiment, as shown in FIG. 1B, when assembled within a downhole motor 90 coupled to a drill string 80, the drive shaft assembly 100, through the joints 104, may transfer both rotational torque and axial thrust loads from a power shaft 92 of the downhole motor to a bearing assembly 94 that rotates the drill bit 95. As will be described more fully below, the joints 104A, 104B of the present invention may enable omni directional articulation of the drive shaft 102 to transfer both the rotational and axial forces. The parts of the downhole motor 90 and the drill bit 95 connected to the drive shaft assembly 100 of the present invention may include conventional elements or parts, with their operation principles, that will be known to one of skilled in the art and are not described herein.

Each joint 104A, 104B may include a housing 106, such as the first housing 106A and a second housing 106B and joint insert portions 108A and 108B, or end portions 108A and 108B, located at both ends of the drive shaft 102. Each housing 106A and 106B may include joint socket portions 110A and 110B and joint connector portions 112A and 112B respectively. The joint insert portions 108A and 108B of the drive shaft 102 may be movably received by the joint socket portions 110A and 110B of the housings 106A and 106B at both ends of the drive shaft 102. The joint insert portions 108A and 108B of the drive shaft 102 may be movably retained within the joint socket portions 110A and 110B by the end caps 250 (FIGS. 6A and 6B) fastened to the joint socket portions 110A and 110B of the housings 106A and 106B at both ends of the drive shaft 102. The joint connector portions 112A and 112B of the housings 106A and 106B may connect the joints to the bearing assembly 94 and a power shaft 92 of the drilling assembly shown in FIG. 1B, such as the joint 104B to the power shaft 92 and the joint 104A to the bearing assembly 94 of the drill bit 95.

The drive shaft 102 may be a cylindrical rod extending along an axis 'A' which may be the rotational axis of the drive shaft 102. Each of the first and second housings 106A and 106B has a generally cylindrical body which may extend along axes of rotation 'B' and 'C', respectively. Without any misalignment between the housings and the drive shaft 102, the axis B and the axis C are aligned with the A axis as if a single axis of rotation for the drive shaft assembly 100. During the operation of the drive shaft assembly 100, there may be an angle between the A axis and B axis and C axis, i.e., offset angle or misalignment angle; or, zero angle between the A axis and B axis and C axis while transferring torque, speed and thrust.

The joints 104A and 104B may have substantively identical features and dimensions; therefore, embodiments below are generally described and exemplified with reference to one of the CV joints, such as the first CV joint 104A. In this respect, the described and illustrated principles as well as features of the first CV joint 104A may be substantively similar to the second CV joint 104B.

Various features of the joint inserts 108A, 108B may be shown in FIGS. 2A, 2B, 2C, 3A, 3B, and 3C.

Figure 2A:
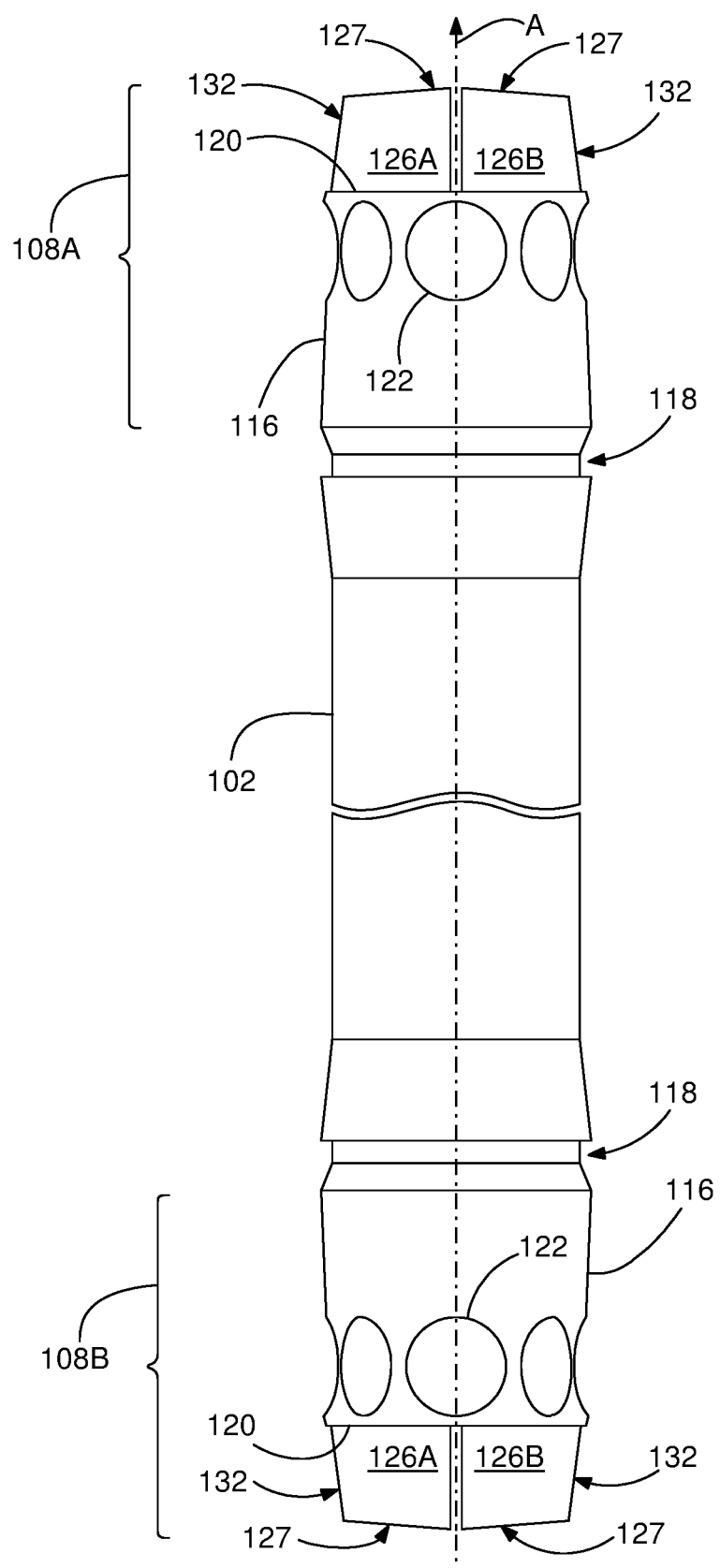
FIG. 2A is a schematic illustration of an embodiment of a drive shaft of the present invention in side view having joint insert portions at opposing ends.
Figure 2B:
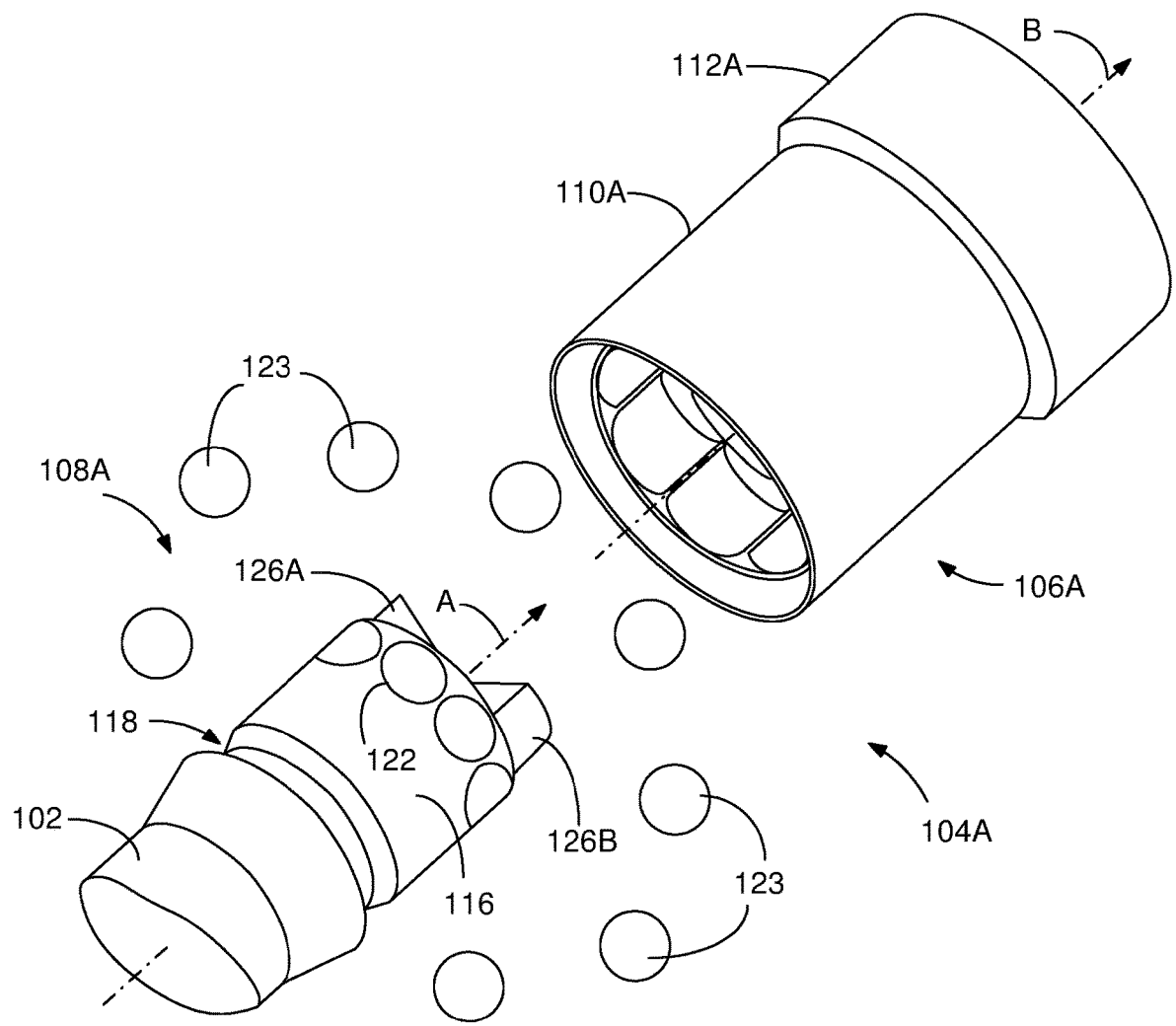
FIG. 2B is a schematic illustration of an embodiment of a CV joint of the present invention in an exploded view including a joint insert portion of a drive shaft and a housing.
Figure 2C:
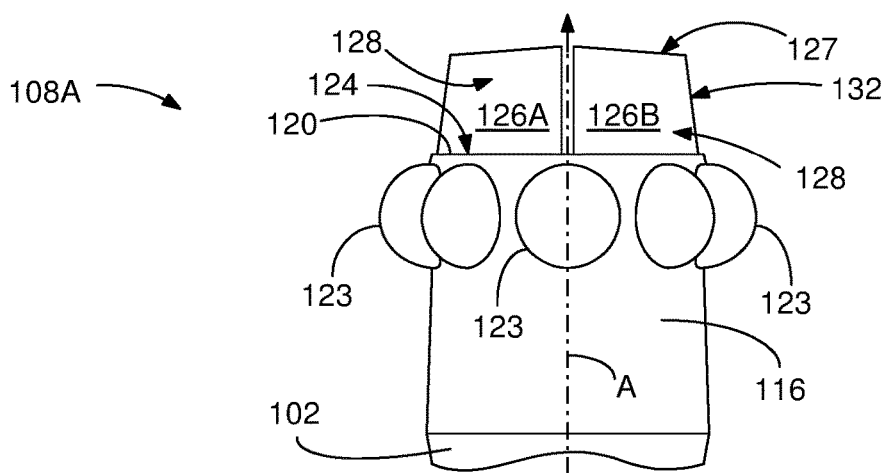
FIG. 2C is a schematic illustration of a side view of an embodiment of a joint insert portion of a drive shaft with ball bearings.

Referring to FIGS. 2A, 2B and 2C, each joint insert portion 108 may include a generally cylindrical side wall 116 extending between a circular recess 118, or annular recess 118, and an end wall 120 of the joint insert portion 108. The cylindrical side wall 116 may include a plurality of pockets 122, or dimples 122, positioned generally adjacent the end wall 120. The pockets 122 may be annularly spaced around the cylindrical side wall 116 and may have spherical concave shape to hold a plurality of projections 123 extending radially from the cylindrical side wall 116. The projections 123 may be integral part of the joint insert portion 108, i.e., welded or manufactured by machining of the joint insert portion. As shown in FIG. 2B, the drive shaft joint insert portion 108A with the projections 123 may be movably received by the joint socket portions 110A of the housing 106A to form the joint 104A.

Referring to FIGS. 2B and 2C, in one example the projections 123 may be spherical ball bearings, and there may be eight annularly spaced side pockets 122 on each joint insert portion 108 to hold eight ball bearings 123, and the ball bearings 123 may be positioned adjacent the end wall 120. As will be described more fully below, within the joints 104, torsional load transfer occurs in a swivel section comprising the spherical surfaces of the ball bearings 123 on the joint insert portion 108 and the inner surfaces of the joint socket portion 110 of the housing 106.

Figure 3A:
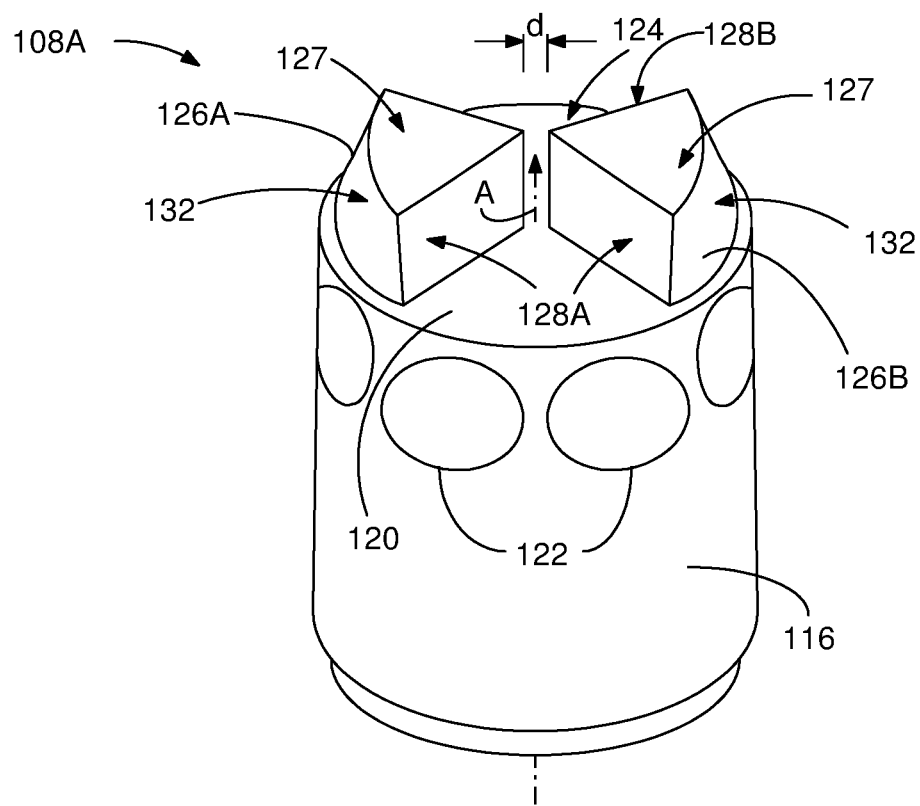
FIG. 3A is a schematic illustration of an isometric view of an embodiment of a joint insert portion of a drive shaft without ball bearings, wherein the circular base surface of the joint insert portion is flat.
Figure 3B:
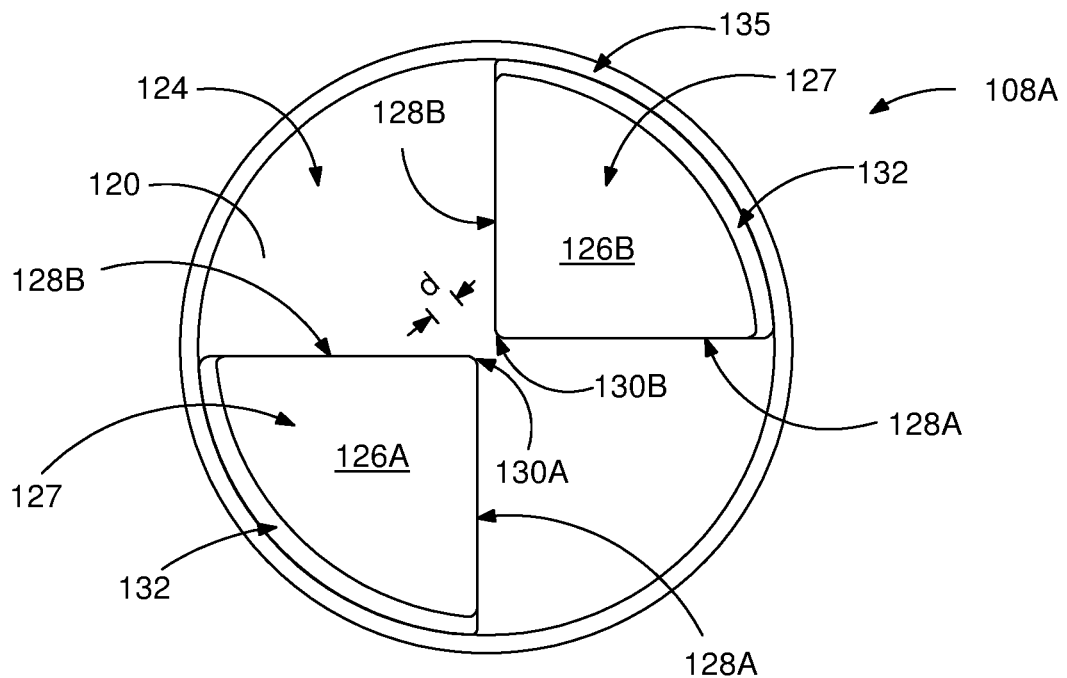
FIG. 3B is a schematic illustration of a top plan view of an embodiment of the joint insert portion of the drive shaft shown in FIG. 3A.

Referring to FIGS. 3A and 3B, in one embodiment, the end wall 120 may have a flat circular end wall surface 124 to which the axis-A of the drive shaft 102 is perpendicular. The end wall 120 may include at least two thrust prongs 126, or thrust lugs 126, such as a first prong 126A and a second prong 126B, extending orthogonally away from the end wall surface 124. The prongs 126 may have a three-dimensional (3D) body which may be identified as a generally wedge shape, or a pie-shape wedge in 3D, or a cylindrical sector shape. Each prong 126A and 126B may extend orthogonally away from their generally sector shape or quadrant shape base, or base area on the end wall surface 124 and terminate at a top surface 127 of each prong, which is also sector shape or quadrant shape.

Referring to FIGS. 3A and 3B, in one embodiment, each prong 126A, 126B may have two flat side surfaces 128A and 128B meeting at prong corners 130A and 130B adjacent the center of the circular end wall surface 124 at an inner end of each prong. At an outer end of each prong 126A and 126B, the flat side surfaces 128A and 128B may terminate at curved side surfaces 132A and 132B. Each curved side surface 132A, 132B may extend from a lower end 134 of the curved side surface, where the curved side surface of the prongs joins the end wall surface 124, to an upper end 136 of the curved side surface, where the curved side surface 132 joins the top surface 127. The lower end 134 of the curved side surface 132 of the prongs 126 may be on the circumference of the circular end wall surface 124 or it may be placed concentrically adjacent the circumference of the surface 124 so that a circular surface strip 135 may be formed between the lower end 134 of the curved side surface 132 and the circumference of the circular end wall surface 124.

Referring back to FIGS. 3A and 3B, in one embodiment, the flat side surfaces 128A and 128B of the prongs 126A, 126B may be perpendicular to the end wall surface 124. The distance 'd' between the prong corners 130A and 130B may be in the range of about 5 mm. The prongs 126A and 126B may be positioned symmetrically about the axis-A. The side surface 128A of the first prong 126A and the side surface 128A of the second prong 126B may be on the same diameter line of the circular end wall surface 124. Similarly, the side surface 126B of the first prong 126A and the side surface 128B of the second prong 126B may be on the same diameter line of the circular end wall surface 124. In one embodiment, the angle between the flat side surfaces 126A and 126B of each prong may be about 90 degrees or less than 90 degrees.

Figure 3C:
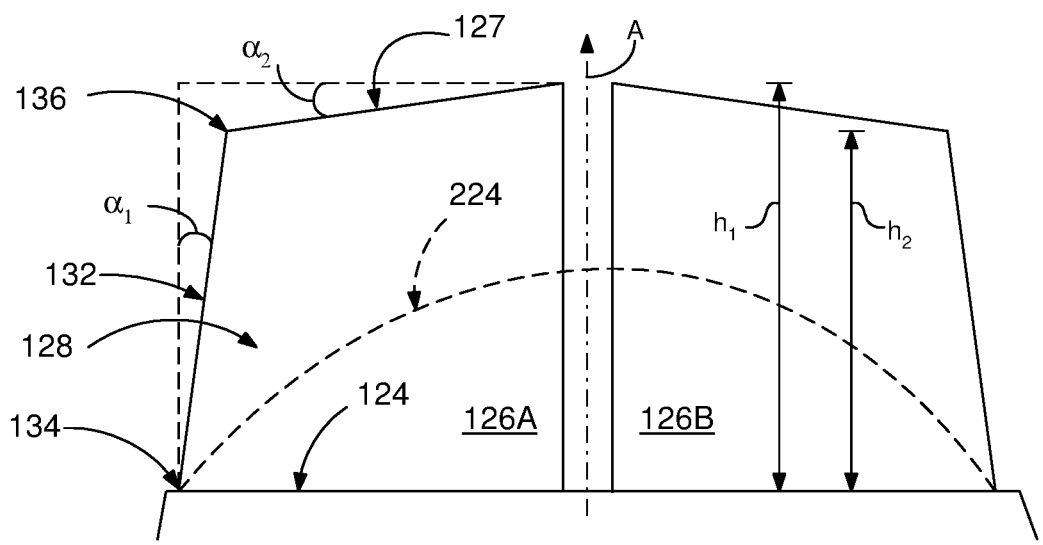
FIG. 3C is a schematic illustration in side detail view of an embodiment of prongs of the joint insert portion of a drive shaft.

Referring to FIGS. 2C, 3B and 3C, in one embodiment, the curved side surface 132 and the top surface 127 of the prongs 126A, 126B may be inclined surfaces. The curved side surface 132 may be inclined by an $\alpha_1$-angle with respect to the surface normal of the end wall surface 124 while the top surface 127 may be inclined by an $\alpha_2$-angle with respect to the plane of the end wall surface 124. As shown in FIG. 3C, due to the angled top surface 127 and the curved side surface 132, prong height $h_1$ at the inner end or the prong corner 132 may be higher than the prong height $h_2$ at the outer end of the prongs 126A, 126B. In one embodiment, $\alpha_1$ and $\alpha_2$ angles may be in the range of about 2 to 5 degrees, and $\alpha_1$ angle may be equal to $\alpha_2$ angle.

The drive shaft 102 may be a cylindrical rod which may be a steel, metal alloy or metal. An exemplary drive shaft material may be a 4330V alloy steel with about 150 psi min yield. The joint insert portions 108 at the opposing ends of the drive shaft may be made by quartering the ends along the diameter of the cylindrical rod and removing a pair of opposing wedge shaped portions by machining to form the prongs 126 with predetermined height on the end wall surface 124. During the material removal process, the curved side surfaces 132 and the top surfaces 127 of the prongs 126A, 126B may be also appropriately angled by machining. The generally cylindrical sector or quadrant shaped prongs 126A, 126B may be smaller than the removed quarter portions to give them predetermined limited movability within the pair of chambers of the housing that receive them. Next, the cylindrical side wall 116 and the pockets 122 of the ball bearings 123 may be formed by machining. The ball bearings may be integral part of the pockets 122 by attaching the ball bearings to the pockets, such as, using welding or other fastening processes. Alternatively, the ball bearings 123 may be movably held by the pockets 122. An exemplary drive shaft 102 may have the following dimensions: about 3" diameter, about 36" length and about 1" prong height.

Referring to FIGS. 4, 5A, 5B, 6A, 6B and 6C, the housings 106 of the CV joints 104A and 104B may have a generally cylindrical body having an outer surface 107. The housings 106A and 106B may have substantively identical features and dimensions; therefore, embodiments below are generally described and exemplified with reference to one of the housings, such as the first housing 106A. In this respect, the described and illustrated principles as well as features of the first housing 106A of the first CV joint 104A may be substantively similar to the second housing 106B of the second CV joint 104B. The cylindrical body of the housing 106A extends along the axis of rotation, denoted 'B', of the housing. The joint socket portion 110A of the housing 106A may include a socket cavity 140A separated from a connector cavity 141A of the joint connector portion 112A by an internal wall 142 of the housing 106A. In the socket cavity 140A, the internal wall 142 may have a surface 145, which may be a flat surface in one embodiment. In this embodiment, the B-axis of the housing 106A may be orthogonal to the plane of the internal wall surface 145. The cavities 140A and 141A of the housing 106A may include a cylindrical socket opening 143A and a cylindrical connector opening 143B.

Figure 4:
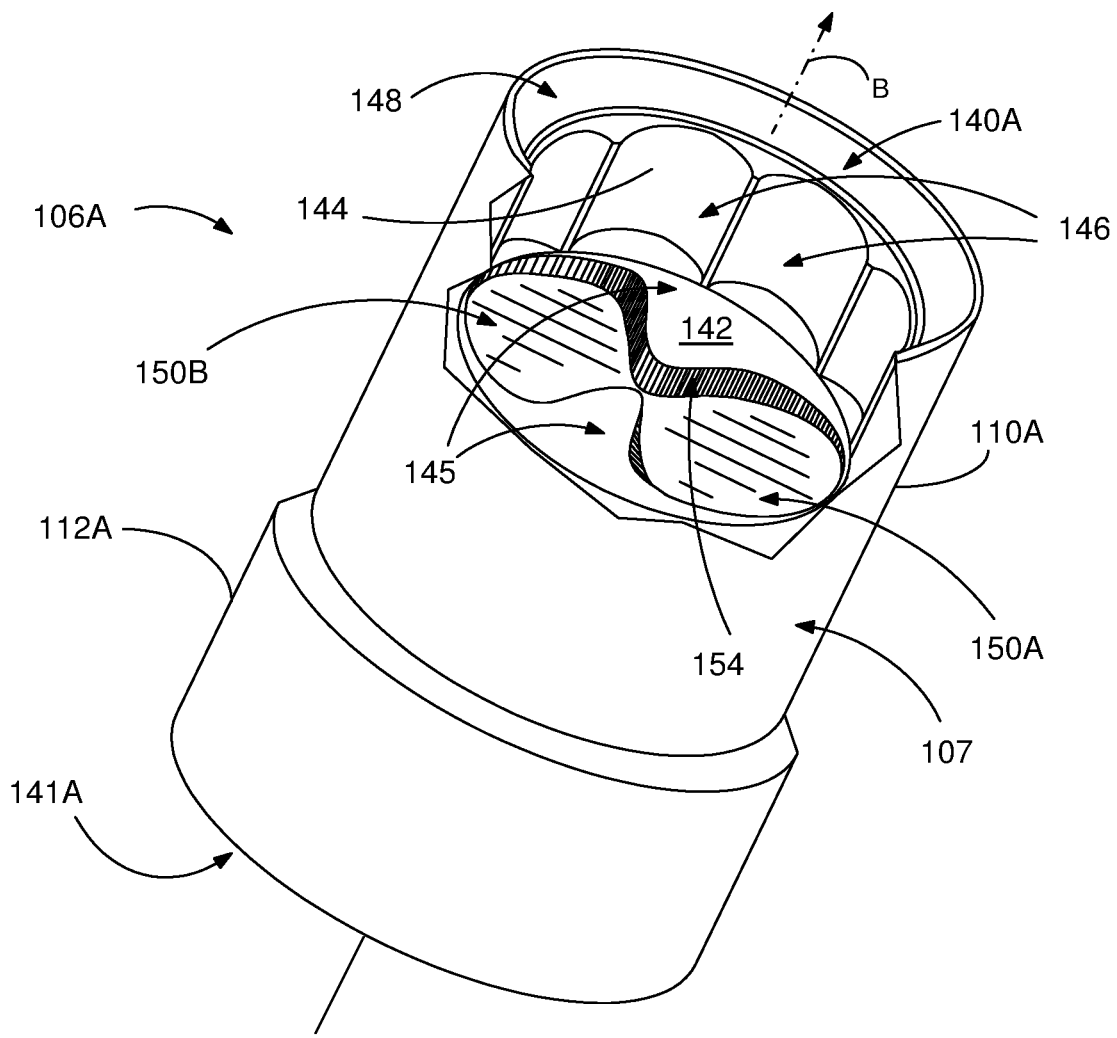
FIG. 4 is a schematic illustration of an isometric partial cut view of the interior of an embodiment of a joint socket portion of a housing of a CV joint having an internal wall including chambers to retain prongs, wherein the internal wall surface is flat.
Figure 5A:
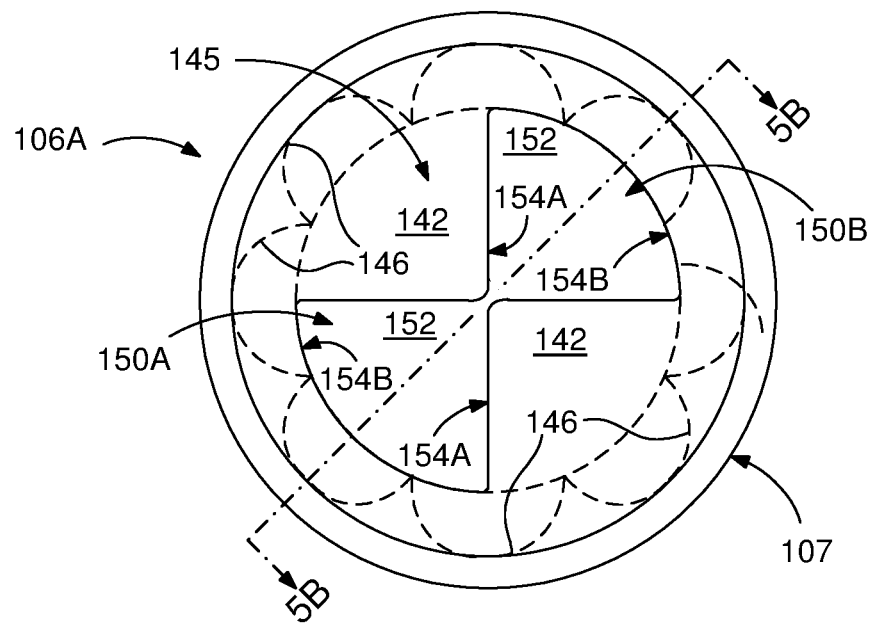
FIG. 5A is a schematic plan view illustration of an embodiment of a socket cavity of the housing showing the inner wall with the cylindrical grooves and the internal wall including the chambers defined by the side walls, back walls and the bottom wall.
Figure 5B:
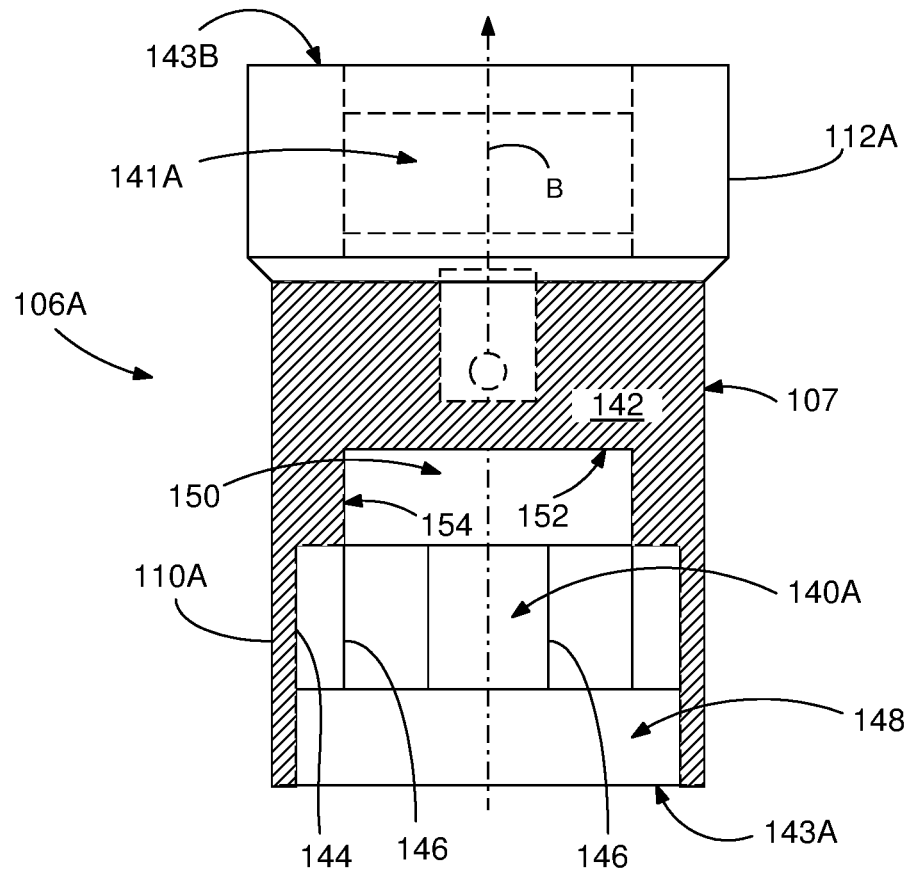
FIG. 5B is a schematic illustration of a cross-sectional view of the housing taken along the line 5B-5B in FIG. 5A.

As shown in an isometric view in FIG. 4, a top view in FIG. 5A and in side view in FIG. 5B, an inner side wall 144 of the socket cavity 140A may include a plurality of cylindrical grooves 146, or slots, extending parallel to the B-axis, which may mate with the ball bearings 123 on the cylindrical side wall 116 of the joint insert portion 108A for torque transfer. The diameter of the ball bearings 123 mounted in the drive shaft 102 may be sized to correspond to the diameter of the cylindrical grooves 146. The grooves 146 may be formed on the inner side wall 144 of the socket cavity 140A and may extend between the internal wall surface 145 and an edge section 148, having a threaded cylindrical surface, adjacent the socket opening 143A of the socket cavity 140A. As will be described below, an end cap 250 (FIGS. 6A-6B) having mating threads engages the threaded edge section 148 of the housing 106A by means of a mating threaded connection to hold the ball bearings 123 in the cylindrical grooves 146 and to movably retain the joint insert portion 108A within the housing 106A. The ball bearings 123 on the joint insert portion 108A and the grooves 146 of the socket cavity 140A may form swivel section of the CV joint 104A enabling angular deflection of the CV joint 104A of the present invention while transferring torque and speed.

The socket cavity 140A may include at least two chambers 150 formed in the internal wall 142, such as a first chamber 150A and a second chamber 150B to retain the prongs 126A and 126B. The chambers 150A and 150B may generally have matching quadrant profile of the prongs 126A and 126B to mate with the prongs 126A and 126B. The chambers 150A and 150B may include a base wall 152 or bottom wall 152, surface of which may be, in one embodiment, parallel to the internal wall surface 145, and chamber walls 154 extending between the internal wall surface 145 and the surface of the bottom wall 152 of the chambers 150A, 150B. The B axis of the housing 106A is normal to the surface of the chamber bottom wall 152. As shown in FIG. 5A, the chamber walls 154 may include side walls 154A and back walls 154B, which are perpendicular to the surface of the bottom wall 152. In one embodiment, the chambers 150A and 150B may be connected at their inner ends toward the center of the internal wall 142. The chambers 150A, 150B may be sized such that there may be a clearance between the surfaces of the chamber walls 154 and the flat side surfaces 128A, 128B and the curved side surfaces 132A, 132B of to prongs 126A and 126B to allow transfer of torque and thrust loads between the housing 106A and the drive shaft 102 while the drive shaft 102 is articulated. In the joints 104, the transfer of thrust may happen between the prongs 126 and the chamber walls 154, 152 and also between the end wall surface 124 and the internal wall surface 145.

The housings 104 may be made of cylindrical rod which may be a steel, metal alloy or metal by machining, such as a 4330V alloy steel with about 150 psi min yield. The chambers 150A, 150B may be formed into the circular internal wall 142 by quartering the circular surface along its diameter and removing a pair of opposing wedge shaped portions by machining to form the pair of straight walled cambers 150A, 150B with predetermined depth within the internal wall 142. The generally cylindrical sector or quadrant shaped chambers 150A, 150B may be slightly larger than the prongs 126A, 126B to give them predetermined limited movability within the chambers of the housing that receive them. An exemplary housing for a 6¾ OD drilling tool may have the following dimensions: about 8" length, an outside diameter of about 5" and chamber depth of about 1" for a drive shaft of about 3" diameter, and about 1" prong height. Ball bearings of the example joint insert portion may be about 1⅛" diameter rock bit balls and the diameter of the receiving cylindrical grooves of the housings may be about 2-50 thousandths larger than the diameter of the ball bearings.

Figure 6A:
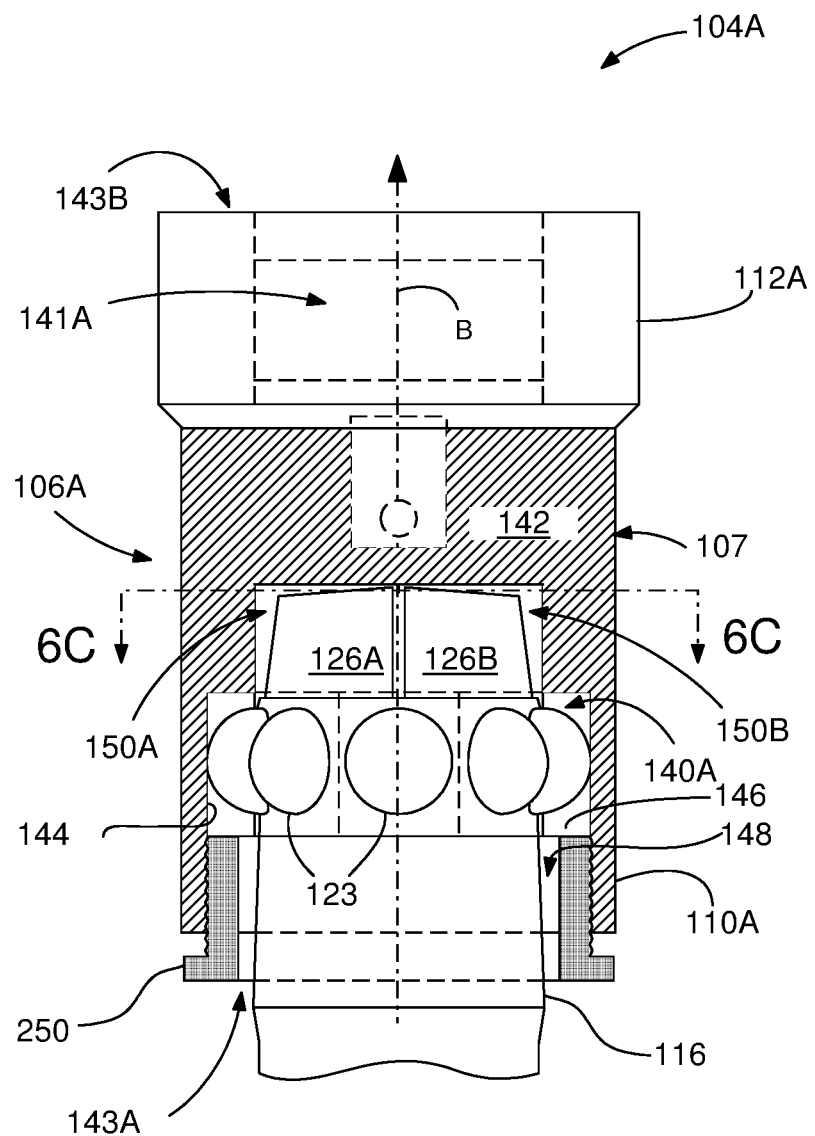
FIG. 6A is a schematic illustration of an embodiment of an assembled CV joint in side view including a joint insert portion of a drive shaft received by a housing.
Figure 6B:
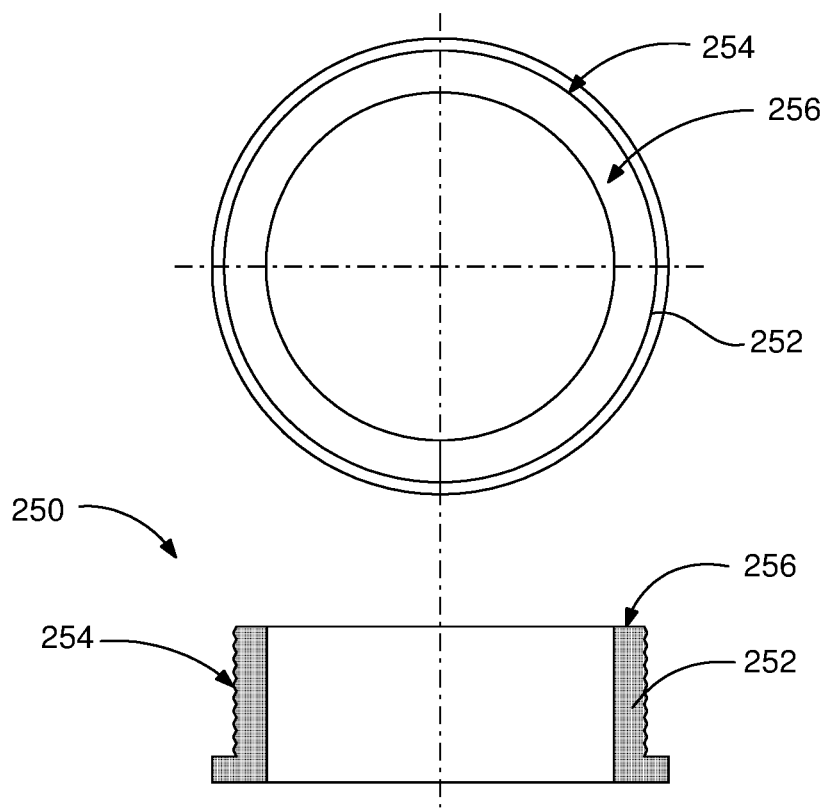
FIG. 6B is a schematic illustration of a housing cap shown in a top view and a cross-sectional view taken along the center of the housing cap.
Figure 6C:
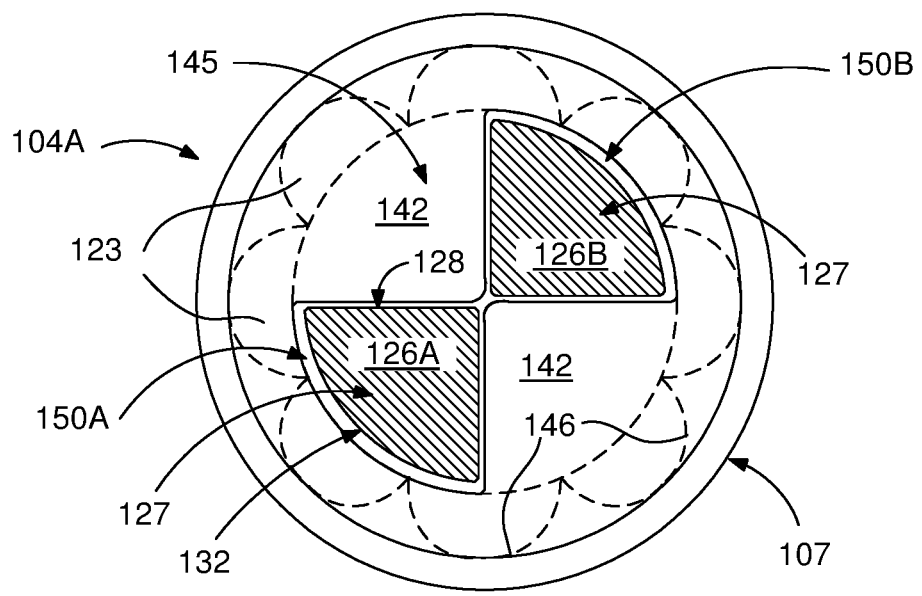
FIG. 6C is a schematic illustration in cut plan view taken along the lines 6C-6C in FIG. 6A showing position of the prongs as being retained in the chambers of the housing of the assembled CV joint of the present invention.

FIG. 6A shows the first joint 104A in side view and FIG. 6C shows the prongs 126A, 126B in the chambers 150A and 150B in a cut plan view of the first joint 104A. Referring to FIGS. 6A and 6C, the joint insert portion 108A of the drive shaft 102 is disposed within the housing 106A to form the joint 104A which provides omni directional motion between the drive shaft 102 and the housing 106A while transferring torque and thrust loads across the drive shaft 102 and the housing 106A during an operation of the drive shaft assembly 100. When the insert portion 108A is disposed within the socket cavity 140A, the ball bearings 123 disposed in the grooves 146 of the socket cavity 140A may primarily transfer torque or torsional loads between the drive shaft 102 and the housing 106, and the prongs 126A, 126B disposed within the chambers 150A, 150B of the socket cavity 140A may primarily transfer thrust or axial loads between the drive shaft 102 and the housing 106 during the operation of the CV joints.

Referring to FIGS. 6A and 6B, an end cap 250, or a retainer 250, having mating threads engages the threaded edge section 148 of the housing 106A by means of a mating threaded engagement to hold the ball bearings 123 in the cylindrical grooves 146 and to movably retain the joint insert portion 108A of the drive shaft 102 within the housings 106A. Similarly, the housing 106B (FIG. 1A) may also include an end cap to hold the ball bearings 123 in the cylindrical grooves 146 and to movably retain the joint insert portion 108B within the housing 106B. The end cap 250 may include an open ended cylindrical wall 252 having an outer surface 254 which has mating threads with the threaded edge section 148 of the housing 106A. The cylindrical wall 252 may surround the joint insert portion 108A and an upper end 256 of the cylindrical wall 252 may block the lower end of the cylindrical grooves 146, thereby holding the ball bearings 123 within the cylindrical grooves and movably retaining the joint insert portion 108A within the joint socket portion 110A, when the end cap is installed. In the following figures the end cap will not be shown for clarity purposes.

Omni directional movement of the joint 104A may be provided by the swiveling movement of the grooves 146 of the housing over the ball bearings 123 on the side wall 116 of the joint insert portion 108A of the drive shaft 102, and the contact of the prong surfaces, i.e., the top surfaces 127, side walls 128 and the curved side walls 132 of the prongs 126A, 126B, with the surface of the chamber bottom wall 152, the surfaces of the chamber side walls 154A and the surfaces of the chamber back walls 154B, as the prong surfaces abut the surfaces of the chamber walls by the axial and rotational movement of the prongs 126A, 126B.

In another embodiment of the present invention, both the flat internal wall surface 145 of the housings 104 and the flat end wall surface 124 of the joint insert portions 108 of the drive shaft 102, described above, may be curved surfaces, such as mating spherical surfaces for smoother transfer of axial and rotational forces between the housings 104 and the drive shaft 102.

Figure 7A:
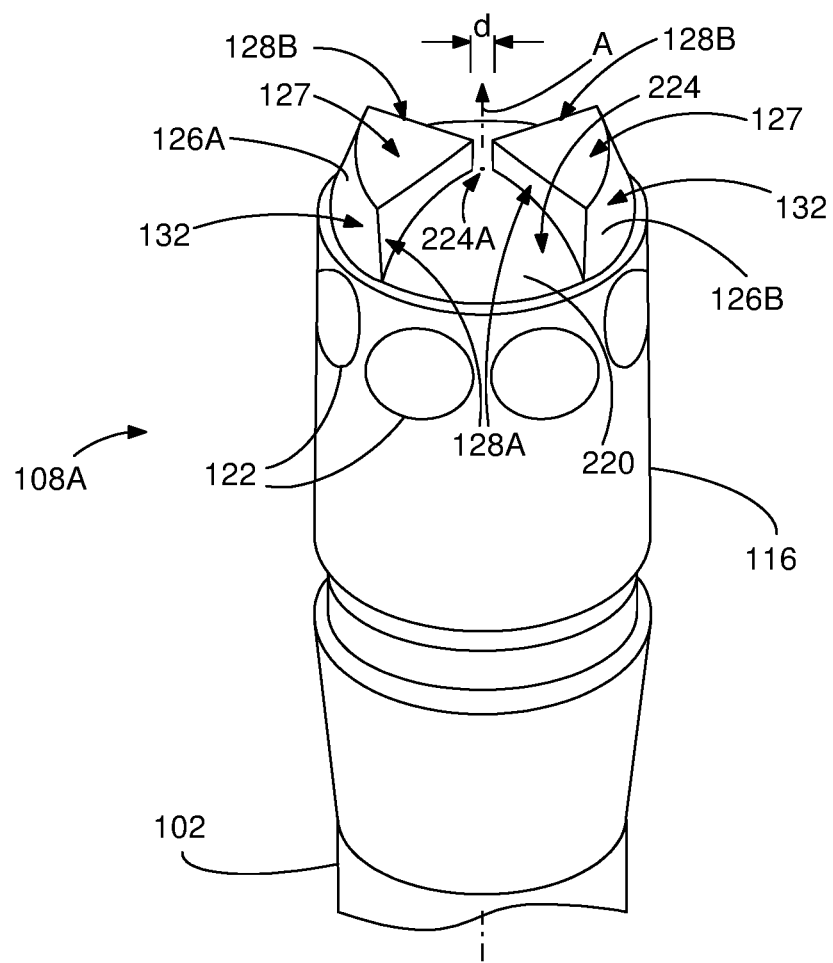
FIG. 7A is a schematic illustration of an isometric view of an embodiment of a joint insert portion of a drive shaft without ball bearings, wherein the circular base surface of the joint insert portion is spherical.
Figure 7B:
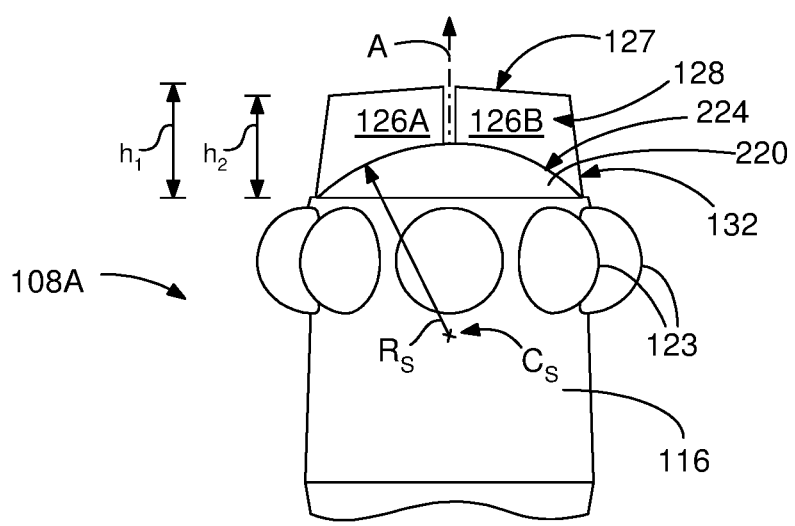
FIG. 7B is a schematic illustration of a side view of an embodiment of joint insert portion of a drive shaft with ball bearings.

As shown in FIG. 7A and FIG. 7B, in an isometric view of the joint insert portion 104A and its side cross sectional view along the prongs 126, respectively, in this embodiment, the end wall 220 of the joint insert portion 108A may be a convex-shaped or dome-shaped wall having a convex-shaped surface 224 or a dome-shaped surface 224. In one embodiment the end wall may be a spherical wall 220 having a spherical surface 224. An apex point or the surface center 224A of the spherical surface 224 may be on the A axis of the drive shaft 102. Depending on the diameter of the cylindrical joint insert portion 108A, the curvature center $C_S$ of the spherical surface 224 with the curvature radius $R_S$ is on the axis A and may be below the level of the centers of the ball bearing 123.

The prongs 126A, 126B may have the same cylindrical quadrant shape with the inner and outer heights $h_1$ and $h_2$ as the prongs described in the previous embodiment. The prong curved side surfaces 132 and the prong top surfaces 127 are substantially the same as the curved side surfaces 132 and the top surfaces 127 described in the previous embodiment. Due to the spherical shape of the end wall 220, the surface area of the flat side walls 128A, 128B of the prongs may be gradually reduced in the direction of the spherical surface center 224A.

Figure 8A:
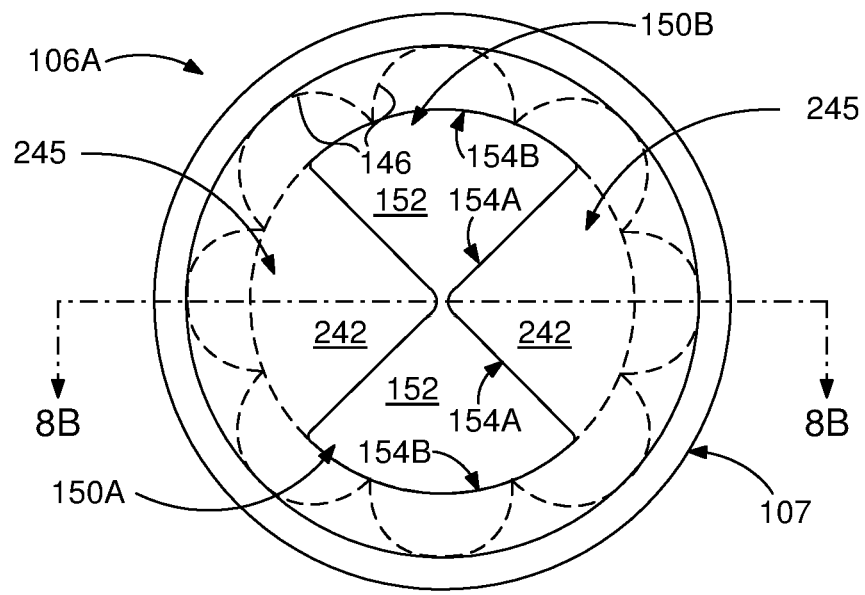
FIG. 8A is a schematic plan view illustration of an embodiment of a socket cavity of a housing showing the inner wall with the cylindrical grooves and the internal wall including the chambers defined by the side walls, back walls and the bottom wall.
Figure 8B:
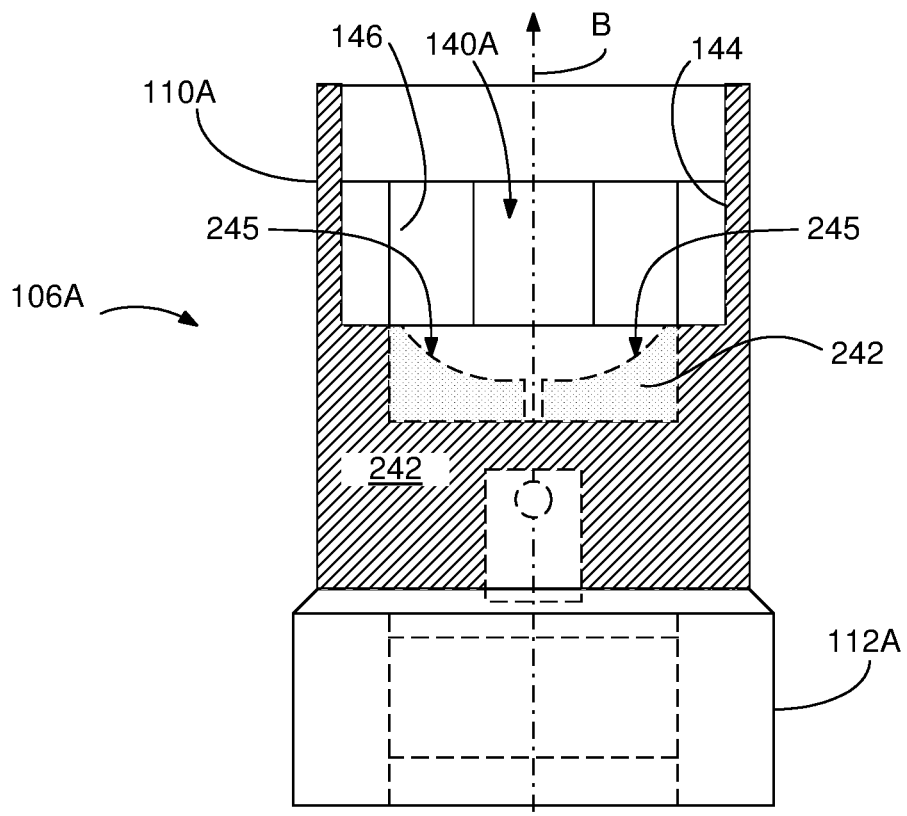
FIG. 8B is a schematic illustration of a cross-sectional view of the housing taken along the line 8B-8B in FIG. 8A, wherein the internal wall surface has at least partially concave shape.

As shown in FIG. 8A and FIG. 8B, in a top view of the joint socket portion 110A and its side cross sectional view along the internal wall 242, respectively. In this embodiment, the internal wall 242 of the joint socket portion 110A may include concave internal wall surface such as a spherical concave surface 245 having a slightly larger curvature radius than the curvature radius of the spherical end wall surface 224 of the joint insert portion 108A. The curvature center $C_S$ of the spherical surface 245 with the curvature radius $R_S$ is on the B axis.

Figure 9:
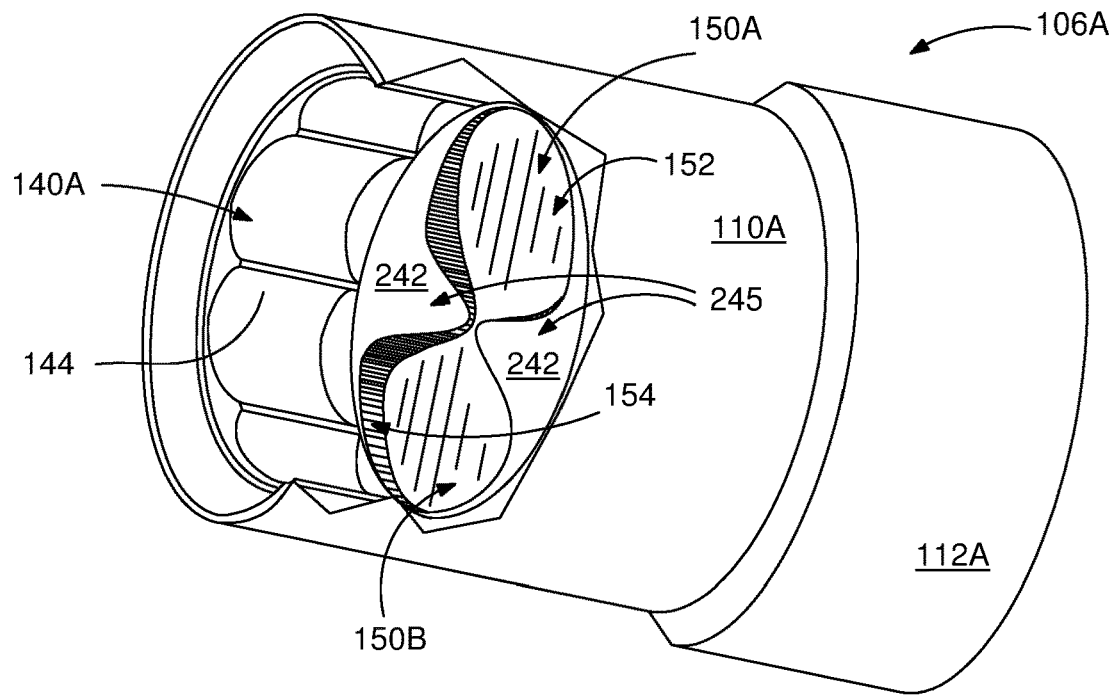
FIG. 9 is a schematic illustration of an isometric partial cut view of an embodiment of the interior of a socket portion of a housing of the drive shaft assembly, wherein the internal wall surface is concave.

FIG. 9 shows in partial cut view of the housing 106A having the concave internal wall surface 245. In this embodiment, the depth or height of the chamber side walls 154A may gradually decrease toward the center of the internal wall 242 so as to receive the spherical end wall surface 245 of the joint insert portion 108A. The side walls 154A and the back walls 154B may extend between the flat bottom wall 152 and the spherical internal wall surface 245. The B axis is normal to the flat bottom wall surface.

Figure 10:
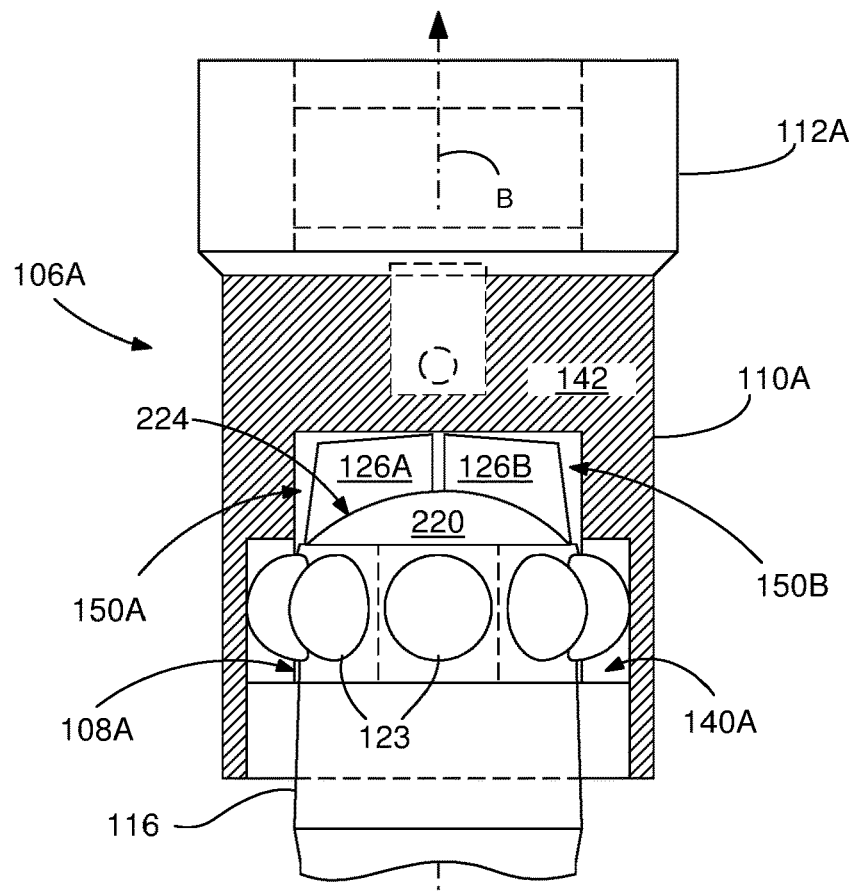
FIG. 10 is a schematic illustration of an embodiment of an assembled CV joint in side view including a joint insert portion of a drive shaft received by a housing, wherein the spherical base surface of the joint insert portion is supported by the concave inner wall surface.

FIG. 10 shows in schematic side view of the joint 104A of this embodiment formed by operatively engaged housing 106A and the joint insert portion 108 of the drive shaft 102. In this view, the prongs 126A. 126B are within the chambers 150A, 150B. In this embodiment, during the operation of the joint 104A, the spherical end wall surface 224 including the prongs 126A, 126B of the joint insert portion 108A may support the spherical internal wall surface 245 of the housing 106A to transfer thrust more efficiently and help center the joint insert portion 108A within the housing 106A to increase performance of the joint 104A. In this embodiment, in the joints 104, the transfer of thrust may happen between the prongs 126 and the chamber walls 154, 152 and also between the spherical end wall surface 224 and the spherical internal wall surface 245.

Figure 11A:
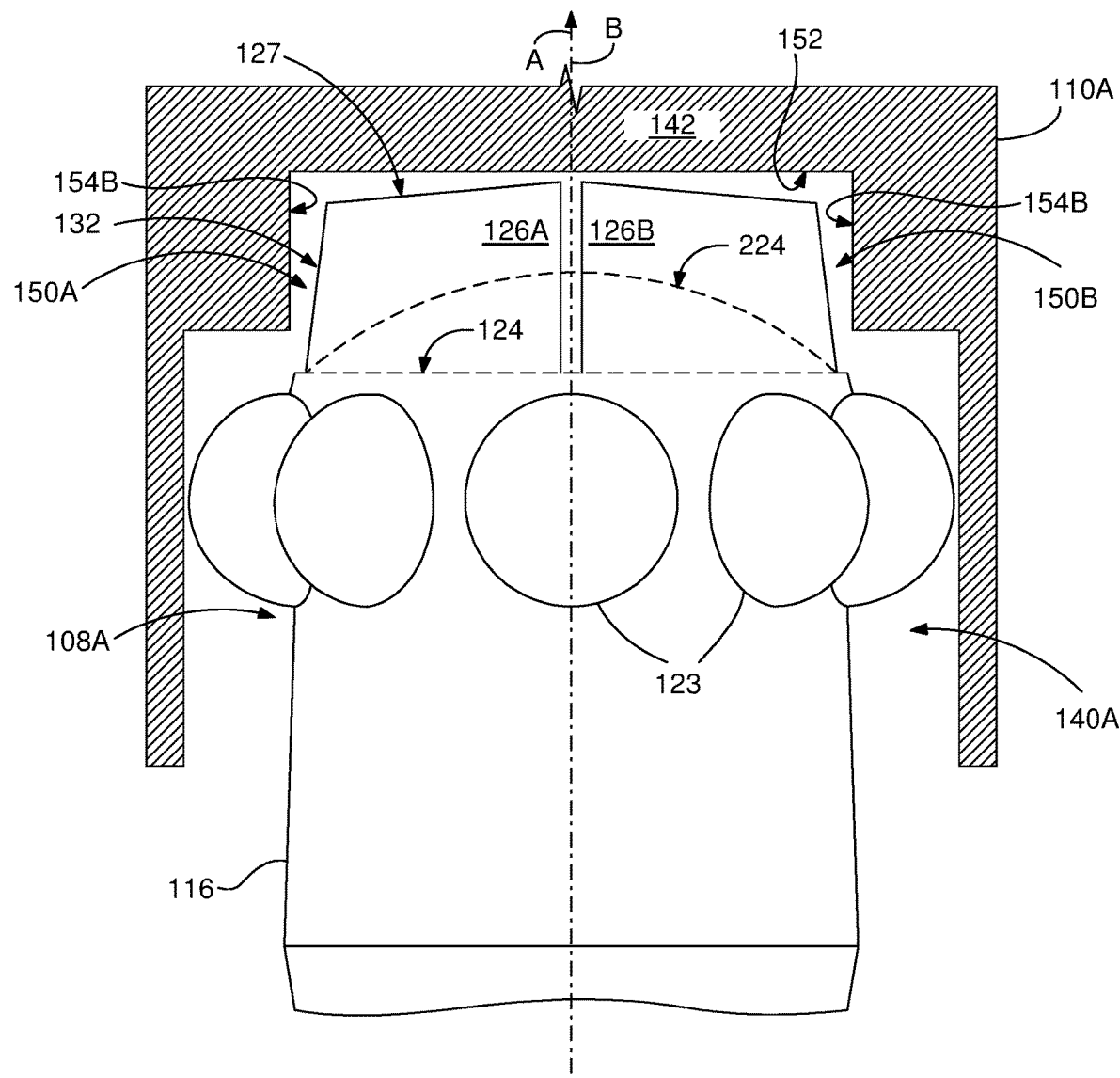
FIG. 11A is a schematic illustration of an embodiment of a CV joint without an angular deflection between the drive shaft and the housing of the CV joint.
Figure 11B:
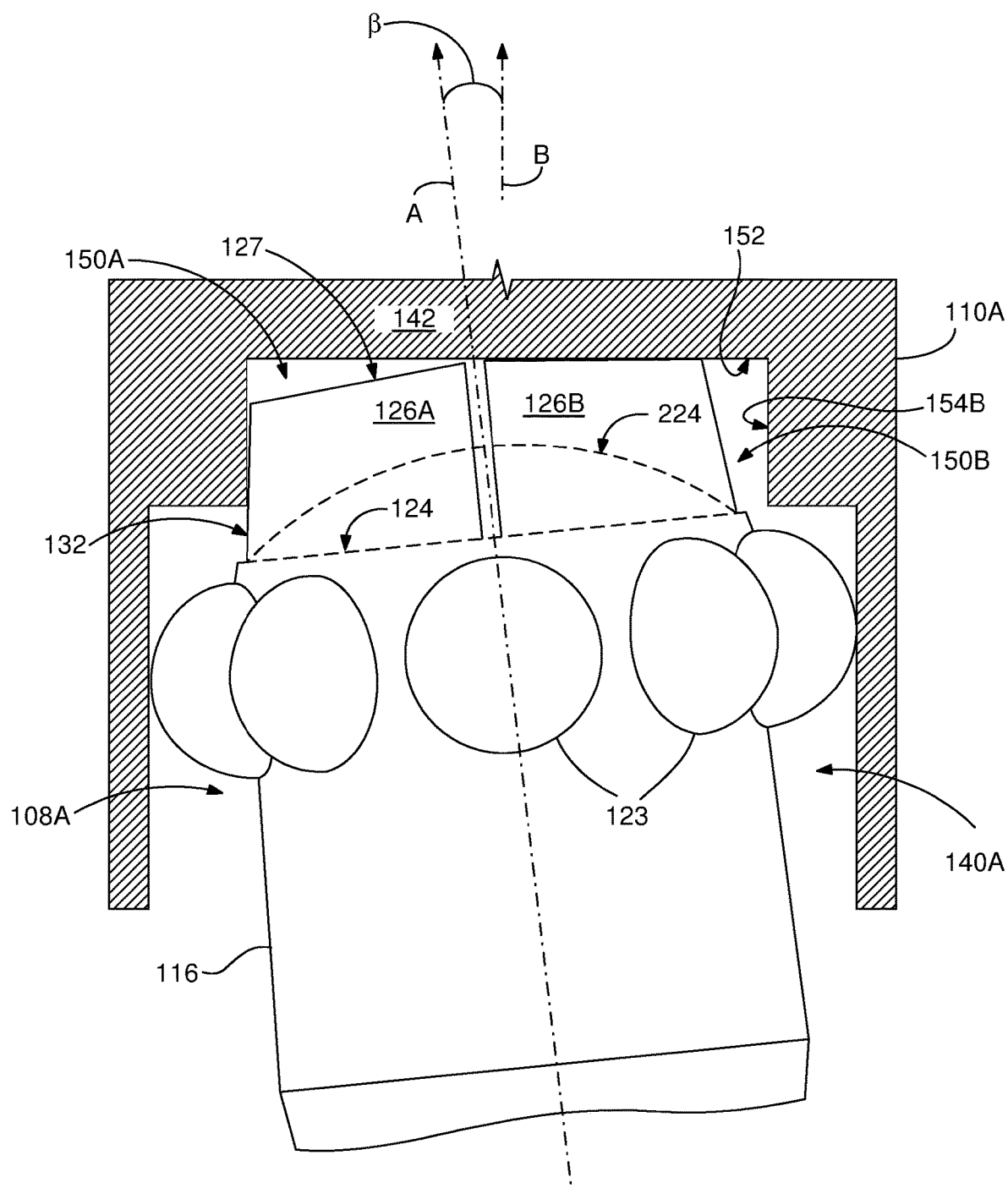
FIG. 11B is a schematic illustration of an embodiment of a CV joint showing an angular deflection between the drive shaft and the housing of the CV joint.
Figure 12A:
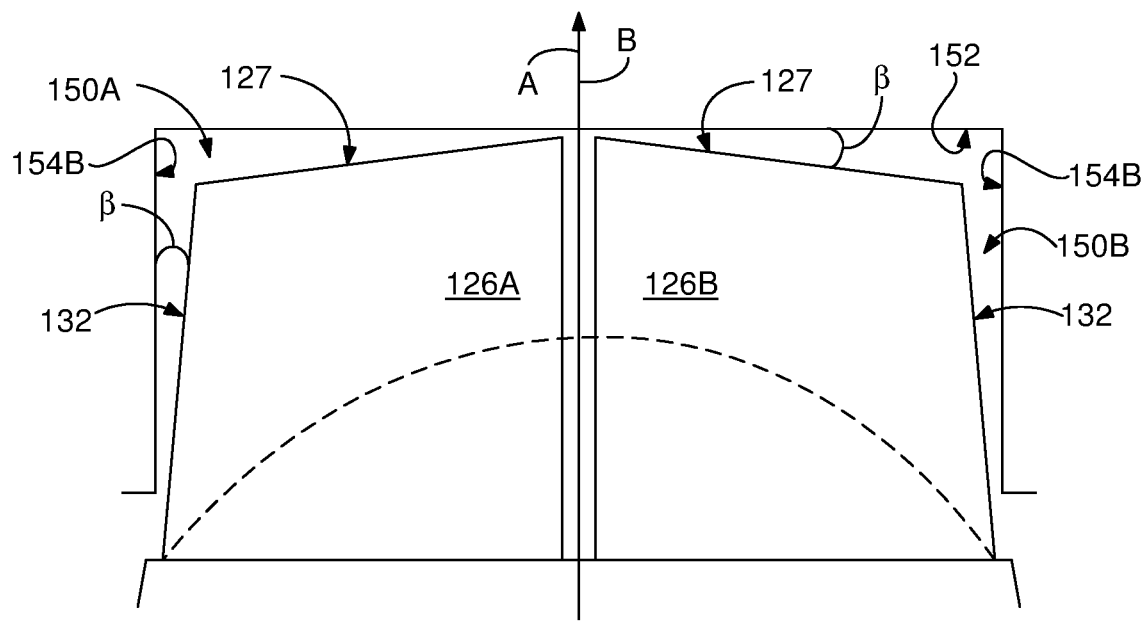
FIG. 12A is a schematic illustration of a position of the prongs within the chambers of the socket portion without any angular deflection of the CV joint of the present invention.
Figure 12B:
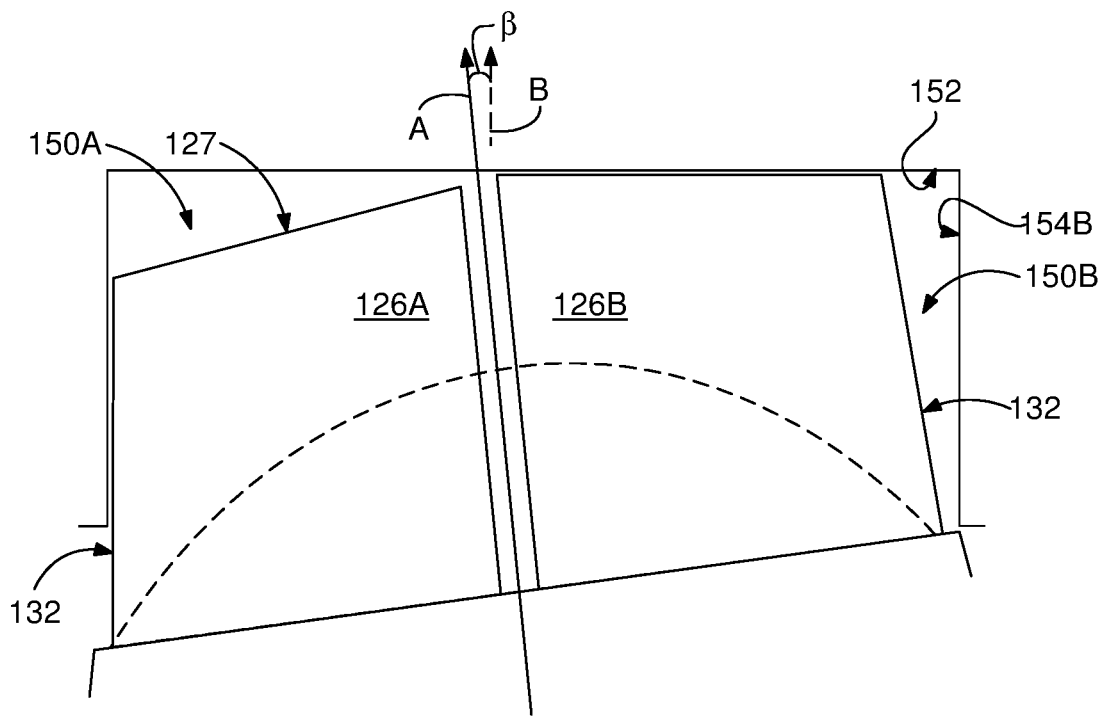
FIG. 12B is a schematic illustration of a position of the prongs within the chambers of the socket portion during an angular deflection of the CV joint of the present invention.

Referring to FIGS. 11A and 11B, angular deflection of the joint 104A of the present invention may be achieved by the swivel section of the joint 104A, transferring torque and speed, in combination with prongs engaging with the chamber walls to transfer torque, speed and thrust, without needing a pivotal feature as in the prior art CV joints. The surfaces of the ball bearings 123 on the joint insert portion 108A and the grooves 146 of the inner side wall 144 may form the swivel section of the CV joint 104A which may enable angular deflection of the CV joint 104A of the present invention, i.e. having an angle, for example β angle, between the A axis and B axis, while transferring torque, thrust and speed.

In this respect, the prongs 126A, 126B may have a range of motion within the chambers 150A, 150B to transfer torque and thrust to the housing 106A or to the drive shaft 102, by contacting, at least partially, the flat side surfaces 128A, 128B to the surfaces of the chamber side walls 154A; by contacting, at least partially, the curved side surfaces 132 to the surfaces of the chamber back walls 154B; and, by contacting, at least partially, the top surfaces 127 to the surface of the chamber bottom wall 152 that they face to. In addition, the prongs 126A, 126B may have a degree of freedom within the chambers 150A, 150B to move axially and provide angular deflection to the joint 104A combined with the angular deflection provided by the swivel section of the joint 104A.

Referring to FIGS. 11A, 11B, 12A and 12B, in an example, to transfer torque and thrust, the angled curved side surfaces 132 and the angled top surfaces 127 of the prongs 126A, 126B may enable the prongs to limitedly angularly shift within the chambers 150A, 150B under a β angle, and with respect to the surfaces of the back wall 154B of the chamber 150B facing to the curved side surface 132 of the prong 126B and the top surface 127 of the prong 126A the facing to the surface of the chamber bottom wall 152 in the chamber 150A. The top surface 127 of the prongs may be angled or flat. An angled top surface may be flat or outwardly curved, such as conical surface section.

In summary, the present invention may provide drive shaft assemblies utilizing constant velocity (CV) joints for support and torque transfer combined with interlocking joint prongs. As shown in the above described FIGS. 1A-12B, the ball bearings on the drive shaft ends may be used to align the joint, provide centering, and torque transfer while the interlocking prongs in the CV joints help transfer thrust, and provide additional torque support to create a long lasting low vibration driveshaft assembly. The ball bearings and the prongs placed on the exterior of the shaft are received in the mating housing cavity of the CV joints. A threaded cap may be installed to retain the ball bearings and the drive shaft assembly. When the shaft of the assembly is rotated, the CV joints move in a manner that allows the assembly to handle angular offset while maintaining near constant velocity. The ball bearings may provide centering for the prongs without utilizing a center pin as in the prior art jaw coupling designs. The resulting joint has lower vibration and extended life. The drive shaft assembly of the present invention allows for long life while minimizing vibrations, lowering operation costs, and offering predictable results.

Although aspects and advantages of the present invention are described herein with respect to certain embodiments, modifications of the embodiments will be apparent to those skilled in the art. Thus, the scope of the present invention should not be limited to the foregoing discussion, but should be defined by the appended claims.

I claim:

1. A drive shaft assembly for a downhole drilling motor, comprising:
   a shaft extending along a first longitudinal axis of rotation, and having a first end portion and a second end portion, each end portion including:
      a circular base surface with a center on the first longitudinal axis of rotation and having a first and second prongs extending away from the base surface in the direction of the first longitudinal axis of rotation, wherein each of the first and second prongs has cylindrical sector shaped body, and
      a cylindrical side wall having a plurality of ball bearings held in a plurality of circumferentially spaced pockets; and
   a first housing extending along a second longitudinal axis of rotation, the first housing including:
      a first end including a first cavity for operatively receiving the first end portion of the shaft, the first cavity being separated from a second cavity located at a second end of the first housing by an internal wall having an internal wall surface, the first cavity including:
         an inner side wall including a plurality of cylindrical grooves, each of which mating with one of the plurality of ball bearings on the first end portion of the shaft to transfer torque between the shaft and the first housing with or without any angular offset between the first and second longitudinal axes of rotation, and
         a first chamber and a second chamber formed in the internal wall surface which are configured to receive and retain the first prong and the second prong to transfer torque and thrust loads between the first end portion of the shaft and the first housing while the circular base surface is supported on the internal wall surface; and
      a second housing, extending along a third longitudinal axis of rotation, having a first end and a second end, the first end of the second housing having a first cavity for operatively receiving the second end portion of the shaft.

2. The drive shaft assembly of claim 1, wherein the circular base surface of the first end portion is a spherical surface having the center on the first longitudinal axis of rotation.

3. The drive shaft assembly of claim 2, wherein the internal wall surface is a concave surface mating with the spherical surface of the first end portion of the shaft.

4. The drive shaft assembly of claim 3, wherein each prong is comprised of two flat side surfaces, a top surface and a curved side surface, the flat side surfaces meeting at a corner adjacent the center of the spherical surface at an inner end of each prong, the curved side surface joining the flat side walls at an outer end adjacent the circular edge of the spherical surface.

5. The drive shaft assembly of claim 4, wherein both the curved side surface and the top surface of the prongs are inclined under a first inclination angle and a second inclination angle respectively.

6. The drive shaft assembly of claim 5, wherein each chamber of the internal wall includes side walls and a back wall, surfaces of which extend parallel to the second longitudinal axis of rotation and between the concave surface and a bottom wall of the chambers, wherein the second longitudinal axis of rotation is normal to the surface of the bottom wall.

7. The drive shaft assembly of claim 6, wherein the curved side surfaces of the prongs are disposed adjacent the back walls of the chambers, the flat side surfaces are disposed adjacent the side walls of the chambers, and the top surface of the prongs are disposed adjacent the bottom wall of the chambers.

8. The drive shaft assembly of claim 5, wherein the first inclination angle is equal to the second inclination angle.

9. The drive shaft assembly of claim 1, the first cavity of the second housing being separated from a second cavity located at a second end of the second housing by an internal wall having an internal wall surface, the first cavity of the second housing including:
   an inner side wall having a plurality of cylindrical grooves, each of which mating with one of the plurality of ball bearings on the second end portion of the shaft to transfer torque between the shaft and the second housing with or without any angular offset between the first and third longitudinal axes of rotation, and
   a first chamber and a second chamber formed in the internal wall surface of the second housing which are configured to receive and retain the first prong and the second prong at the second end portion of the shaft to transfer torque and thrust loads between the second end portion of the shaft and the second housing while the circular base surface is supported on the internal wall surface.

10. The drive shaft assembly of claim 1, wherein the second cavity of the first housing is configured to connect to a power shaft of the downhole drilling motor.

11. The drive shaft assembly of claim 1, wherein the second cavity of the second housing is configured to connect to a bearing assembly of the downhole drilling motor.

12. The drive shaft assembly of claim 1, wherein the ball bearings on the first end portion and the second end portion of the shaft are integral parts of the shaft.

13. The drive shaft assembly of claim 1, wherein the shaft is a cylindrical rod.

* * * * *